United States Patent [19]

Kornrumpf et al.

[11] Patent Number: 4,501,887
[45] Date of Patent: Feb. 26, 1985

[54] PREPARING CELLULOSE ETHERS IN A DIMETHOXYETHANE/(DISPERSING AUXILIARY) MEDIUM

[75] Inventors: Wolfgang Kornrumpf, Eppstein-Bremthal; Eberhard Perplies, Walluf; Josef Hilbig, Taunusstein; Utz-Hellmuth Felcht, Bad Soden - Neuenhain, all of Fed. Rep. of Germany

[73] Assignee: Hoechst Aktiengesellschaft, Frankfurt am Main, Fed. Rep. of Germany

[21] Appl. No.: 581,233

[22] Filed: Feb. 17, 1984

[30] Foreign Application Priority Data

Feb. 25, 1983 [DE] Fed. Rep. of Germany ....... 3306621

[51] Int. Cl.$^3$ ................. C08B 11/04; C08B 11/08; C08B 11/12; C08B 11/193
[52] U.S. Cl. ......................... 536/84; 106/170; 106/311; 252/182; 536/95; 536/98; 536/99
[58] Field of Search .................. 536/84, 98, 95, 99; 252/182; 106/311, 170

[56] References Cited

U.S. PATENT DOCUMENTS

| | | | |
|---|---|---|---|
| 3,284,441 | 11/1966 | Bishop et al. | 536/98 |
| 3,351,583 | 11/1967 | Bishop | 536/95 |
| 4,129,722 | 12/1978 | Iovine et al. | 536/84 |
| 4,137,399 | 1/1979 | Hülsmann et al. | 536/84 |
| 4,278,790 | 7/1981 | McCormick | 536/84 |
| 4,339,573 | 7/1982 | Wüst et al. | 536/84 |
| 4,366,310 | 12/1982 | Leslie | 536/84 |
| 4,419,510 | 12/1983 | Thomson et al. | 536/84 |

FOREIGN PATENT DOCUMENTS 3147434 11/1981 Fed. Rep. of Germany .

OTHER PUBLICATIONS

Bulletin de la Société Chimique de France, 1968, No. 3, pp. 1205–1210.
Ullmanns Encyklopaedie der technischen Chemie, vol. 9, Verlag Chemie-Weinheim, 4th Edition 1975.

*Primary Examiner*—Ronald W. Griffin
*Attorney, Agent, or Firm*—Berman, Aisenberg & Platt

[57] ABSTRACT

In modern processes for the preparation of cellulose ethers containing one or more types of substituents (such as MC, CMC, HEC, HPC, MHEC or EHEC), cellulose is reacted with etherifying agents in the presence of water, base and a mixture of preferably inert organic solvents (as a dispersing auxiliary). Dimethoxyethane (ethylene glycol dimethyl ether) and at least one organic solvent selected from the group including alkanols, alkane diols and alkoxy alkanols (for example, methanol and/or isopropanol) are employed in the mixture of organic solvents used for these syntheses, particularly in quantities of 1 to 30 parts by weight per 1 part by weight of cellulose.

17 Claims, No Drawings

PREPARING CELLULOSE ETHERS IN A DIMETHOXYETHANE/(DISPERSING AUXILIARY) MEDIUM

RELATED APPLICATION

This application is related to application Ser. No. 443,104, filed on Nov. 19, 1982, now U.S. Pat. No. 4,460,766 issued July 17, 1984, the entire disclosure of which is incorporated herein by reference.

TECHNICAL FIELD

The invention relates to a process for the preparation of cellulose ethers. A mixture of organic solvent is employed as a dispersing auxiliary in the reaction medium.

BACKGROUND

The preparation of cellulose ethers having uniform or different types of ether substituents is known [see, for example, Ullmanns Encyklopaedie der technischen Chemie ("Ullmann's Encyclopedia of Industrial Chemistry"), Volume 9, keyword "Celluloseäther" (cellulose ethers), Verlag Chemie-Weinheim, 4th edition 1975, pages 192 et seq], these being prepared, in general, either (a) by the principle of Williamson's ether synthesis by reacting cellulose with alkyl or aralkyl halides (with the consumption of a base) and/or (b) or (c) by reacting cellulose with activated reactants (in the presence of catalytic quantities of a base):

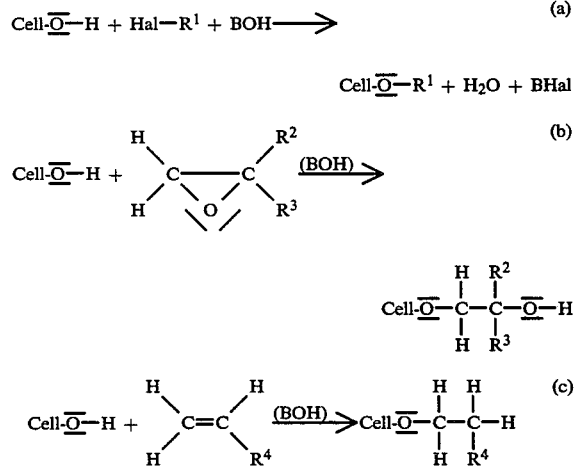

In these general equations:

| | |
|---|---|
| Cell-O—H | denotes, on the cellulose molecule, a hydroxyl group which is to be etherified, |
| Hal | denotes chlorine or bromine, |
| $R^1$ | denotes an alkyl radical from $C_1$ to $C_{15}$, an aralkyl radical from $C_7$ to $C_{15}$, a carboxyalkyl radical from $C_1$ to $C_3$, a sulfonoalkyl radical from $C_1$ to $C_3$, a phosphonoalkyl radical from $C_1$ to $C_3$, a hydroxyalkyl radical from $C_1$ to $C_6$ or an N,N—dialkylaminoalkyl radical in which the alkyl groups, are from $C_1$ to $C_3$, |
| $R^2$ and $R^3$ | denote hydrogen or an alkyl radical from $C_1$ to $C_{13}$, $R^2$ being identical with $R^3$ or different therefrom, |
| BOH | denotes a base, such as NaOH or a quaternary ammonium base, and |
| $R^4$ | denotes an optionally N—substituted carboxylic acid amide or sulfonic acid amide radical or a nitrile radical. |

Mixed ethers cellulose are also prepared by the simultaneous or stagewise action of various etherifying agents on cellulose, in which connection, as well as a reaction process according to only one of the variants (a) to (c) indicated above, in particular, reactions according to at least two of the variants are also carried out. The following are examples of reaction products which are prepared by variant (a): methylcellulose (MC), benzylcellulose (BC), carboxymethylcellulose (CMC), sulfonoethylcellulose (SEC), phosphonomethylcellulose (PMC) or N,N-diethylaminoethylcellulose (DEAEC). The following are examples of reaction products which are prepared by variant (b): hydroxyethylcellulose (HEC) or hydroxypropylcellulose (HPC). The following are examples of reaction products which are prepared by variant (c): sulfonamidoethylcellulose (SAEC) or cyanoethylcellulose (CNEC). Mixed ethers of cellulose which are prepared by the same or different variant(s) of those indicated include, for example, methyl-hydroxyethylcellulose (MHEC), ethyl-hydroxyethylcellulose (EHEC), hydroxyethylhydroxypropylcellulose (HEHPC), methyl-carboxymethylcellulose (MCMC), hydroxyethyl-phosphonomethylcellulose (HEPMC) or methyl-hydroxyethylhydroxypropylcellulose (MHEHPC). Within the scope of subsequent statements, the term "cellulose ethers" is to be understood as meaning both products having a unitary substituent, such as hydroxyethylcellulose, and products having at least two different substituents, such as methylcarboxymethylcellulose.

Most known processes for the preparation of cellulose ethers are carried out in two main stages:
1. The preparation of the "alkali cellulose".
2. The etherification of the cellulose molecule.

In order to prepare the "alkali cellulose", cellulose in a finely-divided (for example ground) form is mixed as homogeneously as possible in suitable technical equipment with water and alkali-metal hydroxide (in general NaOH, but other bases, such as quaternary ammonium bases, are alternatively employed). The alkali-metal hydroxide is used in solid form or in the form of an aqueous solution. For the etherification reaction itself and thus for the quality of the end product of the reaction, the uniformity and intensity of the mixing is of decisive importance. The alkalization is generally effected at as low a temperature as possible, for example room temperature or below, in order to suppress degradation of the polymer (called "ripening"); however, under certain circumstances, for example the subsequent preparation of cellulose ethers of low viscosity, this degradation can also be desirable. The etherifying agent is optionally added as early as the alkalizing stage but, in this case, the temperature must generally be increased further in order to carry out the etherification reaction.

The actual etherification stage is generally carried out by heating the alkali cellulose, produced in the first stage, together with the etherifying agent (which has been added meanwhile), to temperatures between 30° and 120° C. Vigorous mixing in the second stage is also very important for the quality of the reaction product and for the cost efficiency of the process, since, for example, it is desirable to have a good yield in the substitution reaction while employing as small a quantity as possible of etherifying agent(s).

Both continuous and discontinuous procedures are known for both of the reaction stages. In the case of certain reactants, it is also possible to combine the two stages in such a way that pre-alkalization of the cellulose does not take place. Dispersing auxiliaries (suspending agents) are useful in both of the stages, or at least in one of the two stages, in order to achieve better mixing of the heterogeneous reaction mixture, and organic solvents which are either soluble in water or more or less insoluble in water are known from the state of the art.

They include, for example: ethylene glycol monoalkyl ether, ethylene glycol diethyl ether, dioxane, tetrahydrofuran, alkanols (in particular isopropanol or tert. butanol), alkoxyalkanols, toluene, heptane, mixtures of carbon tetrachloride and ethanol, acetone, methyl ethyl ketone; mixtures of benzene, toluene or xylene and ethanol; glycols, dioxane; mixtures of alkanes (of and above $C_6$), aromatics, aliphatic ketones, aliphatic ethers or halogenated alkanes and alkanols ($C_2$ to $C_4$), dimethyl sulfoxide, dioxane or tetrahydrofuran; xylene, mixture of tert. butanol and acetone, mixtures of alkanes or aromatic compounds ($C_6$ to $C_{12}$) and alkanols ($C_1$ to $C_4$).

However, when used in the preparation of alkali cellulose and/or in the etherification of cellulose, the preceding organic solvents, which are known from the state of the art, exhibit at least one of the following disadvantages:

They can undergo side-reactions with strong bases, for example diacetone alcohol is formed in this way from acetone.

They can be at least partially immiscible with water, so that phase separation then takes place (for example in the case of alkanes, aromatic compounds or aliphatic ethers).

Organic solvents containing hydroxyl groups or greater proportions of the latter contained in mixtures can compete with the polyhydroxy compound, cellulose, in reacting with the etherifying agents, so that the yield in the substitution reaction—relative to the cellulose—is reduced (for example in the case of alkanols or alkoxy-alkanols).

They can be toxic, so that they are virtually excluded from modern commerical processes (for example, in the case of dimethyl sulfoxide or dioxane).

The boiling point of the organic solvent is higher than that of water so that recovery by distillation— which is necessary in current processes—is unprofitable, and, in addition, the salts formed as by-products in the etherification then remain in the organic solvent [for example, in the case of ethylene glycol diethyl ether which has a boiling point (b.p. 760) of 123.5° C.].

They can have a tendency to form dangerous by-products (for example, in the case of tetrahydrofuran the formation of peroxides).

The prior, not prepublished, German Offenlegungsschrift No. 31 47 434 discloses a process for the preparation of cellulose ethers which is performed in the presence of water, bases and at least one inert, organic solvent, this solvent being dimethoxyethane. Particular attention is directed to this German Offenlegungsschrift with respect to reference to further prior art publications, process conditions, etc.

SUMMARY OF THE INVENTION

The invention concerns a process for preparing a cellulose ether from cellulose and an etherifying agent in a reaction medium comprising base and dimethoxyethane (as an inert organic solvent), as well as a further organic solvent which acts as a dispersing auxiliary. The dimethoxyethane is in admixture with the further organic solvent, which is an alkanol, an alkanediol and/or an alkoxy alkanol. Further aspects of this invention include reaction media comprising a cellulose ether, etherifying agent and base, along with with dimethoxyethane and the further organic solvent. The combination of dimethoxyethane with the further organic solvent is also part of this invention.

It is the object of the present invention to find an appropriate organic solvent mixture which is suitable as a dispersing auxiliary in syntheses of cellulose ethers and which is useful in a further development of the process described in the previously-noted Offenlegungsschrift.

This object is achieved starting from a process for the preparation of cellulose ethers from cellulose and alkylating agents in the presence of water, base and dimethoxyethane (as an inert organic solvent). The process according to the invention then comprises employing at least one further organic solvent selected from the group of alkanols, alkane diols and alkoxy-alkanols.

DETAILS

Dimethoxyethane (also known as ethylene glycol dimethyl ether or dimethylglycol) is known from the literature; it is a colorless, non-toxic liquid, miscible in all proportions with water and has a boiling point (b.p. 760) of 86° C., while its azeotrope with water (9:1) boils at about 80° C.

The alkanols, alkane diols and alkoxy alkanols in particular comprise $C_1$ to $C_5$ alkanols, $C_2$ or $C_3$ alkane diols (or oligomeric or polymeric individuals containing units constituted by these alkane diols) and alkoxy ($C_1$ to $C_4$) alkan($C_2$ or $C_3$)ols, methanol, ethanol, isopropanol, tert. butanol and ethylene glycol [ethane diol (1,2)] being preferred. Either only one or a mixture of several of these organic solvents is contained in the alkalization and/or etherification mixture apart from the dimethoxyethane. Depending on the etherifying agent(s), i.e., on the type of ether substituent(s) to be obtained, principally all mixing ratios of dimethoxyethane and organic solvent(s) are possible, it being preferred, however, that not more than 50% by weight of alkanols, alkane diols and/or alkoxyalkanols be added, the added amount in particular varying between 0.1 and 30% by weight. Among the organic solvents which can be admixed with the dimethoxyethane, preference is given to methanol and/or isopropanol, for they are frequently also employed during the post-treatment stages of cellulose ether production, for example, in the removal of salts from the raw product, which makes specific recycling possible, in some cases even without having to split the solvent mixture into its individual components. The examples described below also show clearly that the use of a mixture of dimethoxyethane and at least one solvent selected from the group of alkanols, alkane diols and alkoxyalkanols as a dispersing auxiliary in a process for the production of cellulose ethers can lead to the effect that the yield of substitution is in some cases increased and the residue of insoluble components reduced. This effect is observed in particular in the production of water-soluble cellulose ethers. The effects that have been mentioned cannot be achieved, or at least, cannot be achieved to the same degree, if one single component of the mixture of organic solvents is used, so that synergistic interactions obviously take place. Side reactions observed with, for example, the etherifying agent added, do not occur in the process according to the invention (i.e., in the mixture containing dimethoxyethane) or occur only to a minor extent. This applies particularly to those cases where the added amount of these solvents varies between 0.1 and 30% by weight.

The process according to the invention is carried out discontinuously or continuously in one of the units of equipment known from cellulose ether chemistry (for example kneaders, agitator kettles or impeller mixers). When the level of the temperature of the reaction mixture is selected so that it is higher than the boiling point of the mixture of organic solvent/$H_2O$, it is advisable to carry out the process according to the invention in an autoclave; it is also customary to carry out the reaction in an autoclave when reactants, which are already in a gaseous state under normal conditions (standard pressure and room temperature), are used, for example when ethylene oxide is used as the etherifying agent. The quantities indicated in the following embodiments for the components indicate only the sum of the quantities of the components required for the reaction at the start of the etherification stage; at that time part of the cellulose and the alkali-metal hydroxide is already in the form of alkali cellulose, for example when there is a separate alkalization stage; or when, for example, the etherifying agent is introduced into the reaction mixture in the form of acid (for example monochloroacetic acid for the preparation of CMC), additional quantities of base must be employed for neutralization.

The cellulose employed is either of natural origin, for example cottom linters or wood pulp, or is in a regenerated form, such as cellulose hydrate; the particle size of the cellulose before the start of the reaction should, as far as possible, be less than about 2.5 mm, preferably less than about 1 mm, it being possible to achieve this particle size, for example, by grinding cellulose which is supplied in a longer-fibred form to obtain "powders". Compared with known processes, the process of this invention can employ particles which are practically not used otherwise, without the effectiveness of the process being reduced.

The base is preferably an alkali-metal hyroxide—usually NaOH, but optionally KOH or LiOH—in solid form or in a dissolved state as an aqueous alkali-metal hydroxide solution (for example in the form of a 10 to 50% strength, by weight, solution); it is also possible to use an ammonium base. In the process according to the invention it is preferable to employ from about 1 to 30 parts by weight of dimethoxyethane per part by weight of cellulose, and more particularly from 3 to 18 parts by weight. When alkali-metal hydroxides are employed as bases, the amount thereof is, in general, from 0.8 to 12.0 moles, in particular from 1.0 to 6.0 moles, per mole of cellulose (calculated on the basis of an anhydro-D-glucose unit). The proportion of water in the reaction mixture is advantageously within the range of from 5 to 25 moles per mole of cellulose; or, if the mixture of liquids organic solvent/water is intended to serve as a reference quantity, the proportion of water in the mixture is from 3 to 40% by weight. Alkyl chlorides from $C_1$ to $C_3$, alkylene oxides from $C_2$ to $C_4$ and/or chloroalkanoic acids from $C_2$ to $C_6$ or salts or hydrolyzable esters thereof, in particular methyl chloride, ethyl chloride, ethylene oxide, propylene oxide and/or monochloroacetic acid or an appropriate salt or ester, are preferably employed as the etherifying agents. However, it is also possible to carry out the reaction with 1,2-butylene oxide, monochloropropionic acid, chloroethane-sulfonic acid, vinylsulfonic acid, acrylonitrile, chloromethanephosphonic acid, 1-N,N-diethylamino-2-chloroethane or 2,3-epoxypropyltrimethylammonium chloride. The proportion of etherifying agent is usually from 0.05 to 25 moles, in particular from 0.1 to 10 moles, per mole of cellulose.

In carrying out the process according to the invention in practice, it is advantageous first to alkalize the cellulose in a mixture composed of organic solvents, water and an alkali-metal hydroxide (or quaternary ammonium base), after which the etherifying agent is added in the course of one or more stages, depending on the nature of the etherifying agent(s). Alkalization in the absence of organic solvent is also possible; however, the latter is then added at the etherification stage(s), or the entire quantity of base is added only at the etherification stage(s), which then at the same time constitutes the alkalization stage, i.e. separate alkalization is not necessary in this process variant. In each case the reaction mixtures and reaction vessels can, as is known, be flushed with inert gases, such as nitrogen, in order to remove oxygen and thus to achieve high viscosities in the reaction products; it is also possible to add so-called antioxidants (see, for example, German Offenlegungsschrift 2,000,082), such as pyrogallol or gallic acid, in order to prevent reduction in the viscosity (depolymerization).

Irrespective of whether they are carried out as a separate alkalization or etherification stage or as a combination of both stages, all the stages are as a rule operated while stirring well. In the separate alkalization stage, the process is usually carried out at room temperature (from 0° to 30° C., in particular from 15° to 30° C.), while the etherification takes place particularly successfully at a temperature between 30° C. and 120° C., in particular at temperatures up to 90° C. When the alkalization and etherification are carried out in one stage, this stage can be operated at first for some time at room temperature before the temperature is increased to the final level required for the etherification. When the process is to be carried out without using autoclaves, it is advisable to operate it below the boiling point of the organic solvents or of the azeotropic solvent/water mixture. When a gaseous etherifying agent (such as ethylene oxide or methyl chloride) is employed, operating under normal pressure is not advantageous. The maximum pressure set up in the reaction vessel corresponds to the sum of the partial pressures of the components in the reaction mixture.

The times required in the etherification stage are generally—depending on the reaction temperature—between 20 minutes and 8 hours. The crude product is first freed from the bulk of the liquid components in a separating device (for example a centrifuge), preferably after adding acid until unconsumed base has been neutralized, and it can then, if desired, be subjected to extraction in order to remove adhering salts; finally, it is dried and, if desired, ground, mixed with further components or granulated; these methods of working-up, purification and post-treatment are those which are customary in the chemistry of cellulose ethers, and they therefore do not require a detailed description.

As will also become apparent from the examples below, the following are examples of organic solvent mixtures which are preferably used in the synthesis of different types of cellulose ether: in the production of MHEC, a mixture of 1 to 20% by weight of isopropanol and 80 to 99% of dimethoxyethane is used, it also being possible to add up to about 3% by weight of methanol to this mixture; in the production of HEC and NaCMC mixtures of dimethoxyethane and isopropanol, in a broad variety of mixing ratios, are possible (the mixtures in particular containing up to 50% of one component), and in the production of NaCMC it is also possible to use mixtures of 70 to 99% by weight of dimethoxyethane and 1 to 30% by weight of methanol, whereby mixtures of the three solvents are also possible.

The cellulose ethers prepared by the process according to the invention are useful in known fields of technology, i.e., as thickeners, adhesives and additives in the field of building materials, additives in the field of foodstuffs, or the like.

In the examples which follow, parts by weight are related to parts by volume as kg to dm$^3$; the percentages relate to weight. Unless otherwise specified, the indicated viscosity values were determined in a Hoeppler falling ball viscometer in a 2% strength aqueous solution at 20° C. The "DS" is the degree of substitution, i.e. the average number of substituted OH groups per anhydro-D-glucose unit; in the case of cellulose it is within the range from 0.0 to 3.0. The "MS" is the molar degree of substitution, i.e. the average number of moles of the substituting reagent which have been attached by an ether linkage per mole of anhydro-D-glucose unit; in the case of cellulose it can be even greater than 3.0; it is normally used instead of the DS in order to characterize those substituents on the cellulose ether which can be formed by multiple substitution at an OH group, i.e. in the case of the hydroxyalkyl substituent because the resulting OH groups of the hydroxyalkyl groups can also be substituted—like the OH groups of the cellulose itself.

COMPARATIVE EXAMPLE C1

172 parts by weight (p.b.w.) of a spruce sulfite cellulose (ground to 0.5 mm) are suspended in 1,300 p.b.w. of dimethoxyethane (DME, 7.6 p.b.w. per 1 p.b.w. of cellulose) and, in a pressure-tight kettle, mixed with a solution of 253 p.b.w. of a 39.5% strength NaOH solution (2.75 moles of NaOH per mole of cellulose) within 5 minutes. The mixture is stirred for 45 minutes at room temperature, then 17.6 p.b.w. of ethylene oxide (0.4 mole per mole of cellulose) and 162 p.b.w. of methyl chloride (3.2 moles per mole of cellulose) are added, and the etherification mixture is reacted for 60 minutes at 40° C. and for another 90 minutes at 95° C. After being worked up in a customary manner (for example, hot water washing) a MHEC having the following characteristics is obtained (about 0.13 mole of NaOH remain unreacted): MS$_{HE}$ of 0.23; DS$_M$ of 1.65; viscosity of 23,000 mPa.s; residue of about 2%; coagulation point at 73° C.

EXAMPLE 1

The procedure as described in comparative example C1 is followed, but the alkalization and etherification are performed in a mixture of 1,160 p.b.w. of DME and 140 p.b.w. of isopropanol (IPA, 100% strength). The degree of etherification and the viscosity of the reaction product obtained are substantially identical to those of the MHEC of C1, but clear solutions in water form more readily, which can, for example, be seen from the fact that only 0.4% of residue is left and that the haze of a 1% strength aqueous solution measured using a photometer is substantially reduced (down to about one-half to one-third of the value obtained in C1).

COMPARATIVE EXAMPLE C2

The same procedure as described in comparative example C1 is followed, but the alkalization and etherification are performed in 1,300 p.b.w. of IPA (100% strength). Compared with a MHEC according to C1 and, in particular, to example 1, the characteristics of the reaction product obtained are significantly impaired: MS$_{HE}$ of 0.16; DS$_M$ of 1.08; viscosity of 10,500 mPa.s; residues about 10 to 11%; coagulation point at 95° C., haze about 10 times greater than in C1.

EXAMPLES 2 TO 7 AND COMPARATIVE EXAMPLES C3/C4

Following the procedure as indicated in comparative example C1, a MHEC is prepared, the molar ratio of cellulose:NaOH:methyl chloride:ethylene oxide:H$_2$O being 1:2.75:3.2:0.4:8.5. In each mixture the amount of organic solvents is 1,300 p.b.w., the characteristics of the products obtained are compiled in Table I. The haze of the solution according to C3 is about 3 to 6 times greater than in the examples; in the case of C4, the haze is at least 20 times greater.

TABLE I

| Example | Weight % of DME | Weight % of IPA | Residue (Weight %) | DS$_M$ | MS$_{HE}$ | non-reacted NaOH (mole) |
|---|---|---|---|---|---|---|
| C3 | 100 | 0 | 2.0 | 1.60 | 0.22 | 0.10 |
| 2 | 96.5 | 3.5 | 1.5 | 1.61 | 0.22 | 0.07 |
| 3 | 94.3 | 5.7 | 1.0 | 1.59 | 0.21 | 0.07 |
| 4 | 92.9 | 7.1 | 1.1 | 1.63 | 0.22 | 0.03 |
| 5 | 89.2 | 10.8 | 0.5 | 1.63 | 0.23 | 0.03 |
| 6 | 85.4 | 14.6 | 0.8 | 1.62 | 0.21 | 0.05 |
| 7 | 77.6 | 22.4 | 1.0 | 1.58 | 0.20 | 0.12 |
| C4 | 0 | 100 | 11.0 | 1.08 | 0.16 | 0.03 |

EXAMPLE 8

In principle, the same procedure as described in comparative example C1 is followed, but using 17.2 p.b.w. of a spruce sulfite cellulose, 120 p.b.w. of DME, 10 p.b.w. of IPA and 29.6 p.b.w. of a 48.7% strength aqueous NaOH solution. Alkalization is performed for 35 minutes, then 1.8 p.b.w. of ethylene oxide and 22.9 p.b.w. of methyl chloride are added, the mixture is heated to a temperature of 65° C. within 10 minutes and reacted for 35 minutes at this temperature and for another 60 minutes at 105° C. The MHEC thus obtained has the following characteristics: MS$_{HE}$ of 0.15; DS$_M$ of 1.95; viscosity of 21,000 mPa.s; residues 0.30%; coagulation point of 68° C.; the haze approximately corresponds to that of examples 3 to 7.

COMPARATIVE EXAMPLE C5

The procedure followed is the same as described in example 8, but using 130 p.b.w. of DME as the sole organic solvent. The degree of etherification, viscosity and coagulation point of the MHEC are practically identical to those of the MHEC of example 8, but it dissolves less readily in water into a clear solution, which manifests itself, for example, in residues of 0.75% and a considerably increased haze (about three times higher than the value measured in example 8).

EXAMPLE 9

47 p.b.w. (0.27 mole) of cotton linters (ground to 0.5 mm) are suspended in a mixture of 89.0 parts by volume (p.b.v.) of methanol, 633.0 p.b.v. of DME and 70.5 p.b.v. of H₂O, and to this mixture 14.2 p.b.w. (0.355 mole) of NaOH are added. The mixture is alkalized for 30 minutes while stirring, thereafter 35 p.b.w. of sodium monochloroacetate are added, and the etherification mixture is reacted for 90 minutes at a temperature of 65° C. After being worked up in a customary manner, a NaCMC having the characteristics compiled in Table II below is obtained.

COMPARATIVE EXAMPLE C6

The procedure followed is the same as described in example 9, but using 712 p.b.v. of DME as the sole organic solvent. The haze of a 1% strength aqueous solution is about 4 times higher than that measured in example 9.

EXAMPLE 10

The procedure followed is the same as described in example 9, but using spruce sulfite cellulose, 674 p.b.v. of DME, 75 p.b.v. of IPA, 46 p.b.v. of H₂O, 26.7 p.b.w. of NaOH (0.67 mole), and 28.7 p.b.w. (0.3 mole) of monochloroacetic acid.

COMPARATIVE EXAMPLE C7

The procedure followed is the same as described in example 10, but using 749 p.b.v. of DME as the sole organic solvent and 52.2 p.b.w. of cellulose. The haze is about 5 times higher than in example 10.

TABLE II

| Example | Weight % of DME | IPA or Methanol | DS | Substitution yield (%) | Viscosity (1% solution) (mPa·s) | Residue due (%) |
|---|---|---|---|---|---|---|
| 9 | 88 | 12 | 0.71 | 64 | 2,150 | 1.20 |
| C6 | 100 | 0 | 0.61 | 55 | 2,700 | 2.80 |
| 10 | 90 | 10 | 0.80 | 73 | 10,500 | 0.65 |
| C7 | 100 | 0 | 0.74 | 67 | 12,000 | 1.50 |

EXAMPLES 11 TO 15 AND COMPARATIVE EXAMPLES C8 TO C16

The cellulose material, i.e., spruce sulfite cellulose in examples 11 to 13 and in C8 to C12, and cotton linters in examples 14 and 15 and in C13 to C16 (amounts as indicated in Table III) and the dispersing auxiliary (850 p.b.v. per 100 p.b.w. of cellulose) are filled in a kneader. Then the aqueous NaOH solution (1 mole of NaOH per 1 mole of cellulose in examples 11 to 13 and in C8 to C12, and 1.3 moles of NaOH per 1 mole of cellulose in examples 14 and 15 and in C13 to C16) is added, and the alkalization reaction is performed for 30 minutes at room temperature. This suspension is completely transferred into an autoclave, the ethylene oxide is added, the autoclave is closed, and the mixture is reacted for 60 minutes at 30° C. and for 60 minutes at 70° C. while stirring. After being worked up in a customary manner (such as acidifying and freeing from salt by washing), an HEC having the characteristics compiled in Table III is obtained. It can be seen that the substitution yield (selectivity) in pure IPA is considerably lower than in pure DME, but using a mixture of the two solvents, a further slight improvement is possible. The haze of a 1% strength aqueous solution which has been prepared using IPA exclusively is about as high as the haze observed using the mixtures, whereas, using DME exclusively, the haze is at least about twice as high as that of the mixtures. This means that mixtures of DME and IPA yield products possessing improved dissolution properties, while at the same time a high substitution yield (i.e., economical raw material input) and reduced formation of by-products (i.e., low loss of raw material and low pollution of the waste water) is maintained, compared with the use of pure DME.

TABLE III

| Example | Mole per mole of cellulose H₂O | Mole per mole of cellulose Ethylene oxide | Weight % of DME | Weight % of IPA | Viscosity+ (mPa·s) | MS | Substitution yield (%) |
|---|---|---|---|---|---|---|---|
| C8 | 10.0 | 4.0 | 100 | 0 | 35,000 | 2.5 | 62 |
| C9 | 10.0 | 4.0 | 100 | 0 | 41,000 | 2.6 | 65 |
| C10 | 10.0 | 4.0 | 100 | 0 | 51,000 | 2.7 | 67 |
| 11 | 10.0 | 4.0 | 90 | 10 | 29,000 | 2.8 | 70 |
| 12 | 10.0 | 4.0 | 80 | 20 | 11,000 | 2.8 | 70 |
| 13 | 10.0 | 4.0 | 80 | 20 | 18,000 | 2.6 | 66 |
| C11 | 15.9 | 4.5 | 0 | 100 | 26,000 | 2.0 | 45 |
| C12 | 15.9 | 4.5 | 0 | 100 | 30,000 | 2.0 | 44 |
| C13 | 16.2 | 5.0 | 100 | 0 | 4,500 | 2.7 | 54 |
| C14 | 16.2 | 5.0 | 100 | 0 | 13,000 | 3.0 | 60 |
| C15 | 13.0 | 4.0 | 100 | 0 | 38,000 | 2.4 | 60 |
| C16 | 13.0 | 4.0 | 100 | 0 | 65,000 | 2.4 | 60 |
| 14 | 13.0 | 4.0 | 95 | 5 | 6,700 | 2.4 | 60 |
| 15 | 13.0 | 4.0 | 95 | 5 | 2,700 | 2.5 | 62 |

+Different viscosity values, e.g., depend on the cellulose quality and are also due to the fact that variations in the viscosity reduction occur if no special care is taken that the preparatory works (exclusion of oxygen) and parameters are always the same.

EXAMPLES 16 to 19 AND COMPARATIVE EXAMPLES C17 to C21

In principle, the procedure followed is the same as described in the foregoing examples and comparative examples, but using cotton linters and 1.3 moles of NaOH per 1 mole of cellulose. The reaction mixtures are added into a reaction vessel of a volume 300 times greater than in the previous examples, and correspondingly increased amounts of the individual components are employed. The reaction vessel is equipped with an additional high-capacity mixer (homogenizing pump in a bypass arrangement) and is repeatedly flushed with nitrogen. The first etherification stage is conducted for 120 minutes (for amounts and results see Table IV). In examples 16 to 19 and C17 to C19, 1,160 p.b.v. of dispersing auxiliary are used instead of 850 p.b.v. The haze values are within the scope of the preceding examples.

TABLE IV

| Example | Mole per mole of cellulose H₂O | Mole per mole of cellulose Ethylene oxide | Weight % of DME | Weight % of IPA | Viscosity+ (mPa·s) | MS | Substitution yield (%) |
|---|---|---|---|---|---|---|---|
| C17 | 13.6 | 4.5 | 100 | 0 | 68,000 | 2.9 | 65 |
| C18 | 13.6 | 4.5 | 100 | 0 | 12,000 | 2.9 | 65 |
| C19 | 13.6 | 4.5 | 100 | 0 | 59,000 | 2.9 | 65 |
| 16 | 13.6 | 4.5 | 97.5 | 2.5 | 125,000 | 2.9 | 65 |
| 17 | 13.6 | 4.5 | 97.5 | 2.5 | >150,000 | 2.9 | 65 |
| 18 | 13.6 | 4.5 | 92.5 | 7.5 | 130,000 | 2.9 | 65 |
| 19 | 13.6 | 4.5 | 92.5 | 7.5 | 12,000 | 2.7 | 60 |
| C20 | 16.2 | 5.5 | 0 | 100 | 40,000 | 2.9 | 53 |
| C21 | 16.2 | 5.5 | 0 | 100 | 35,000 | 3.1 | 56 |

+see footnote to Table III

The invention and its advantages are readily understood from the preceding description. It is apparent that various changes may be made in the process and in the compositions without departing from the spirit and scope of the invention or sacrificing its material advantages. The described process and compositions are merely illustrative of preferred embodiments of the invention.

What is claimed is:

1. In a process for preparing a cellulose ether from cellulose and etherifying agent in a reaction medium comprising base and inert organic solvent, the improvement wherein the inert organic solvent is an admixture of dimethoxyethane with at least one further organic solvent selected from the group consisting of alkanol, alkane diol and alkoxy alkanol, the admixture comprising from 0.1 to 50 percent by weight of the other organic solvent, based on the weight of the admixture.

2. A process as claimed in claim 1 which comprises (a) an alkalization stage followed by (b) an etherification stage.

3. A process as claimed in claim 2 wherein the alkalization stage is effected in reaction medium containing the further organic solvent.

4. A process as claimed in claim 3 wherein the reaction medium comprises from 1 to 30 parts by weight of dimethoxyethane per part by weight of cellulose.

5. A process as claimed in claim 4 wherein the etherifying agent comprises at least one member selected from the group consisting of (a) an alkyl chloride having from 1 to 3 carbon atoms, (b) an alkylene oxide having from 2 to 4 carbon atoms, (c) a chloroalkanoic acid having from 2 to 4 carbon atoms, (d) a salt of (c) and (e) an ester of (c).

6. A process as claimed in claim 3 wherein the etherifying agent comprises at least one member selected from the group consisting of (a) an alkyl chloride having from 1 to 3 carbon atoms, (b) an alkylene oxide having from 2 to 4 carbon atoms, (c) a chloroalkanoic acid having from 2 to 4 carbon atoms, (d) a salt of (c) and (e) an ester of (c).

7. A process as claimed in claim 2 wherein the alkalization stage is effected in reaction medium free from the further organic solvent.

8. A process as claimed in claim 7 wherein the etherification stage is effected in reaction medium having from 1 to 30 parts by weight of dimethoxyethane per part by weight of cellulose.

9. A process as claimed in claim 8 wherein the etherifying agent comprises at least one member selected from the group consisting of (a) an alkyl chloride having from 1 to 3 carbon atoms, (b) an alkylene oxide having from 2 to 4 carbon atoms, (c) a chloroalkanoic acid having from 2 to 4 carbon atoms, (d) a salt of (c) and (e) an ester of (c).

10. A process as claimed in claim 7 wherein the etherifying agent comprises at least one member selected from the group consisting of (a) an alkyl chloride having from 1 to 3 carbon atoms, (b) an alkalene oxide having from 2 to 4 carbon atoms, (c) a chloroalkanoic acid having from 2 to 4 carbon atoms, (d) a salt of (c) and (e) an ester of (c).

11. A process as claimed in claim 7 wherein the etherification stage is effected in reaction medium, up to 30 percent of the total organic solvent of which is said further organic solvent.

12. A process according to claim 1 wherein alkanol is a $C_1$ to $C_5$ alkanol, alkane diol is a $C_2$ or $C_3$ alkane diol or an oligomeric or polymeric compound containing units constituted by one or both of these diols and alkoxy alkanol is a ($C_1$ to $C_4$) alkoxy ($C_2$ or $C_3$) alkanol.

13. A reaction medium comprising cellulose, etherifying agents, base, dimethoxyethane and at least one further organic solvent selected from the group consisting of alkanol, alkane diol and alkoxyalkanol.

14. A reaction medium according to claim 13 which contains water and wherein the further organic solvent comprises $C_1$ to $C_5$ alkanol.

15. A reaction medium according to claim 13 which contains water and wherein the further organic solvent comprises $C_2$ or $C_3$ alkane diol or an oligomeric or polymeric compound containing units constituted by one or both of these diols.

16. A reaction medium according to claim 13 which contains water and wherein the further organic solvent comprises a ($C_1$ to $C_4$) alkoxy ($C_2$ or $C_3$) alkanol.

17. An admixture of dimethoxyethane with at least one other organic solvent selected from the group consisting of alkanol, alkane diol and alkoxy alkanol, the admixture comprising from 0.1 to 30 percent by weight of the other organic solvent, based on the weight of the admixture.

* * * * *

UNITED STATES PATENT OFFICE
CERTIFICATE OF CORRECTION

PATENT NO. : 4,501,887

DATED : February 26, 1985

INVENTOR(S) : WOLFGANG KORNRUMPF, EBERHARD PERPLIES, JOSEF HILBIG, UTZ-HELLMUTH FELCHT

It is certified that error appears in the above-identified patent and that said Letters Patent are hereby corrected as shown below:

Column 12, line 11, "alkalene" should read --alkylene--.

Signed and Sealed this

Ninth Day of July 1985

[SEAL]

Attest:

DONALD J. QUIGG

Attesting Officer

Acting Commissioner of Patents and Trademarks